(12) United States Patent
Fredriksson et al.

(10) Patent No.: US 7,767,338 B2
(45) Date of Patent: Aug. 3, 2010

(54) METHOD FOR MANUFACTURING A BIPOLAR BATTERY AND A BIPLATE ASSEMBLY

(75) Inventors: Lars Fredriksson, Täby (SE); Neil Puester, Aurora, CO (US)

(73) Assignee: Nilar International AB, Taby (SE)

( * ) Notice: Subject to any disclaimer, the term of this patent is extended or adjusted under 35 U.S.C. 154(b) by 1055 days.

(21) Appl. No.: 11/485,534

(22) Filed: Jul. 13, 2006

(65) Prior Publication Data

US 2006/0248709 A1     Nov. 9, 2006

Related U.S. Application Data

(62) Division of application No. 10/241,455, filed on Sep. 12, 2002, now Pat. No. 7,097,937.

(30) Foreign Application Priority Data

Sep. 19, 2001    (SE)   ................................ 0103115

(51) Int. Cl.
*H01M 6/48* (2006.01)
*H01M 2/08* (2006.01)
*H01M 10/18* (2006.01)

(52) U.S. Cl. ........................ 429/210; 429/185; 29/623.1

(58) Field of Classification Search ................ 429/185, 429/210; 29/623.1
See application file for complete search history.

(56) References Cited

U.S. PATENT DOCUMENTS

| | | | |
|---|---|---|---|
| 5,254,415 A | 10/1993 | Williams et al. | ............ 429/153 |
| 5,344,723 A | 9/1994 | Bronoel et al. | ................. 429/84 |
| 5,688,615 A | 11/1997 | Mrotek et al. | ............... 429/210 |

FOREIGN PATENT DOCUMENTS

| | | |
|---|---|---|
| DE | 19838121 | 2/2000 |
| EP | 0512417 | 11/1992 |
| EP | 0726610 | 8/1996 |
| GB | 2160704 | 12/1985 |
| WO | 94/17563 | 8/1994 |
| WO | 95/29513 | 11/1995 |
| WO | 96/12313 | 4/1996 |
| WO | 98/05081 | 2/1998 |

*Primary Examiner*—Tracy Dove
(74) *Attorney, Agent, or Firm*—Capitol City TechLaw

(57) ABSTRACT

The present invention relates to a bipolar battery having at least two battery cells comprising: a sealed housing, a negative end terminal, a positive end terminal, at least one biplate assembly arranged in a sandwich structure between said negative and positive end terminals, and a separator, including an electrolyte, arranged between each negative and positive electrode forming a battery cell. The biplate assembly is provided with an inner barrier of a hydrophobic material around the negative and the positive electrode, respectively, and an outer seal around the edge of each biplate. Each end terminal is provided with a terminal seal. The edge of each biplate is positioned close to the sealed housing to provide means to conduct heat from each biplate assembly to the ambient environment. The invention also relates to a method for manufacturing a bipolar battery and a biplate assembly.

18 Claims, 4 Drawing Sheets

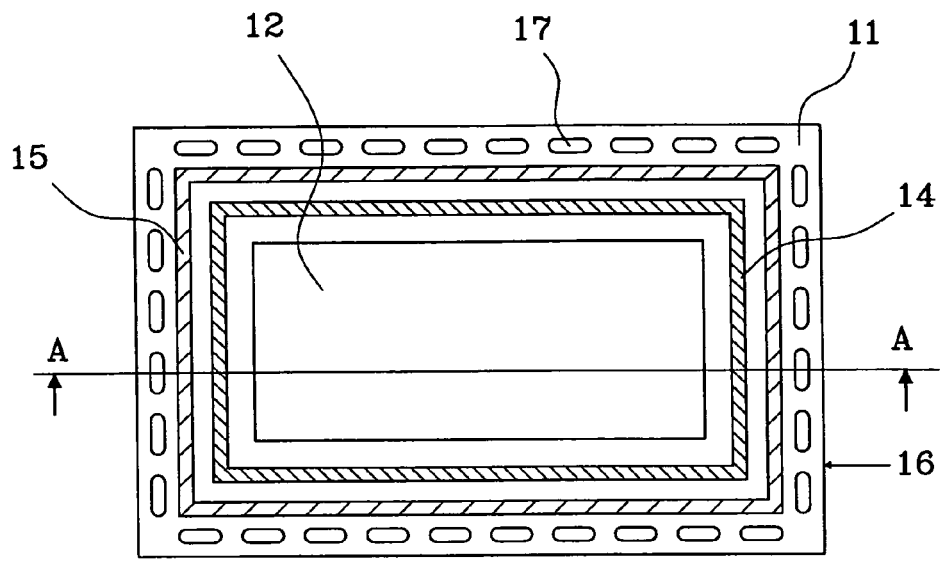
Fig. 1
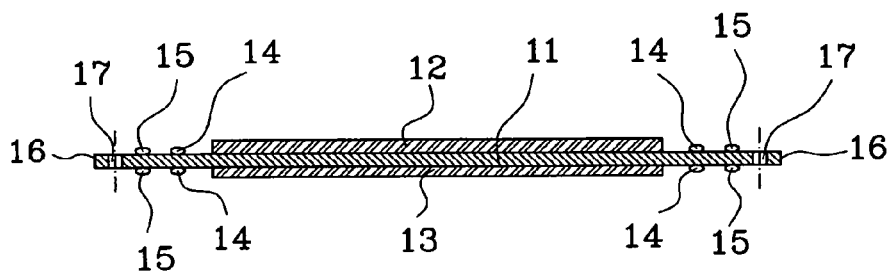
Fig. 2 (A-A)
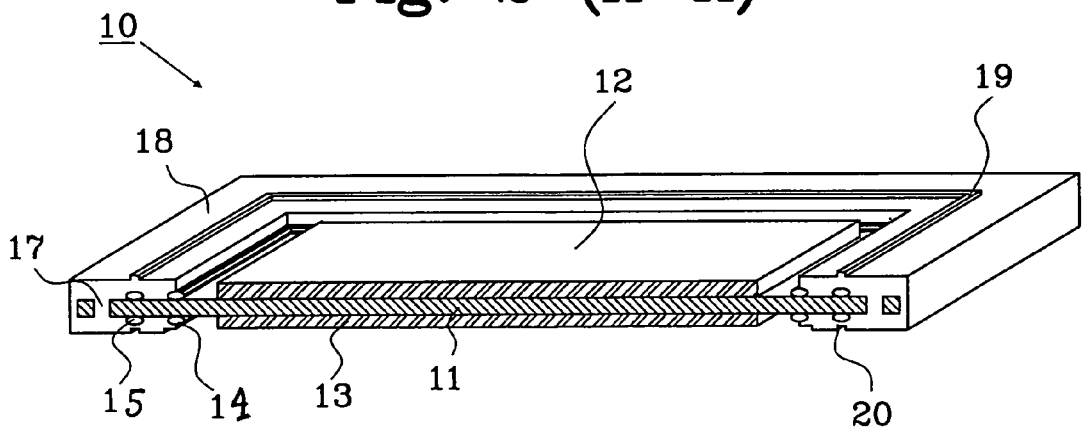
Fig. 3

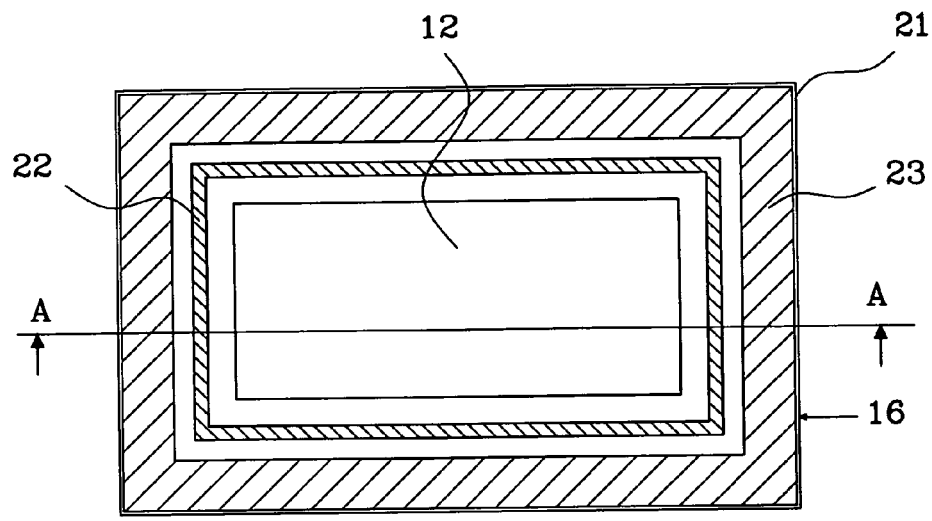
Fig. 4
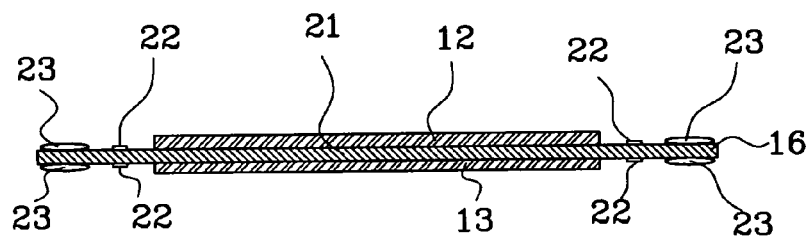
Fig. 5 (A-A)
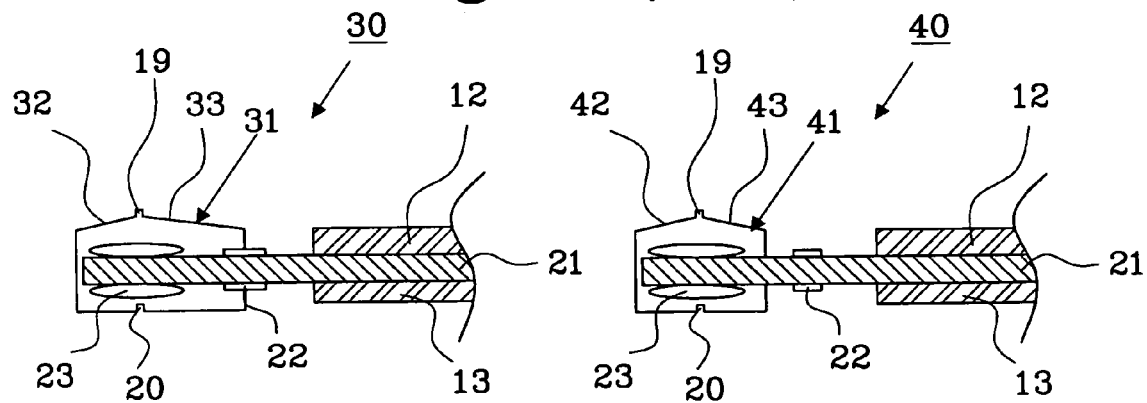
Fig. 6          Fig. 7

METHOD FOR MANUFACTURING A BIPOLAR BATTERY AND A BIPLATE ASSEMBLY

CROSS REFERENCE TO RELATED APPLICATIONS

This application is a Divisional application of U.S. application Ser. No. 10/241,455, filed Sep. 12, 2002, now U.S. Pat. No. 7,097,937 which claims priority from Swedish Patent Application No. SE 0103115-2 filed on Sep. 19, 2001, the entire contents of all of which are hereby incorporated herein by reference.

BACKGROUND

1. Field of the Invention

Example embodiments of the present invention relate to a method for manufacturing a bipolar battery and a biplate assembly.

2. Discussion of the Related Art

In theory, bipolar batteries can be used to improve battery energy storage capacity on a weight and volume basis, to reduce packing weight and volume, to provide stable battery performance and low internal resistance.

A bipolar battery construction comprises an electrically conductive bipolar layer, so called biplate, that serves as electrical interconnection between adjacent cells in the battery as well as a partition between the cells. In order for the bipolar construction to be successfully utilised, the biplate must be sufficiently conductive to transmit current from cell to cell, chemically stable in the cell's environment, capable of making and maintaining good contact to the electrodes and capable of being electrically insulated and sealable around the boundaries of the cell so as to contain electrolyte in the cell.

These requirements are more difficult to achieve in rechargeable batteries due to the charging potential that can accelerate corrosion of the biplate and in alkaline batteries due to the creep nature of electrolyte. Achieving the proper combination of these characteristics has proven very difficult. For maintenance-free operation it is desirable to operate rechargeable batteries in a sealed configuration. However, sealed bipolar designs typically utilise flat electrodes and stacked-cell constructions that are structurally poor for containment of gases present and generated during cell operation. In a sealed construction, gases generated during charging need to be chemically recombined within the cell for stable operation. The pressure-containment requirement creates additional challenges in the design of a stable bipolar configuration.

Battery manufacturers have not developed bipolar batteries commercially because a working seal design has always been a problem. The vast majority of development work to date has been strictly related to lead/acid technology. The seal is difficult to achieve due to the galvanic creepage of the electrolyte, the corrosive conditions and the heat and pressure generated by the battery. Other manufacturers have tried to make leak-proof seals, and use rigid approaches that ultimately fail due to thermal expansion and pressure changes. In the subject disclosure, the leakage has been separated into two components: electrolyte leakage and gas leakage. A hydrophobic barrier is used in conjunction with a starved electrolyte condition to prevent electrolyte from reaching the pressure seal. The pressure seal is flexible and designed to move with the biplate.

Bipolar batteries have the theoretical advantage to improve battery energy storage efficiency, with reduced weight, volume and cost. The bipolar approach is simple in concept, with both a direct, uniform and short current path, and a minimum number of parts which allow ease of assembly. Despite these potential advantages, there are no bipolar batteries commercially produced at this time. A review of patent applications reveals many patents on lead acid designs. There are only a few for Nickel based battery systems (e.g. DE 198 381 21 by Deut Automobil GmBH)

New requirements in the field of transportation, communications, medical and power tools are generating specifications that existing batteries cannot meet. These include higher cycle life and the need for rapid and efficient recharges.

NiMH systems are seen as the alternative to meet cycle life, but costs for existing conventional fabrication are too high.

There is a need for a battery that offers high power charge and discharge capability with long life at affordable prices.

SUMMARY

An object of the present invention is to provide a bipolar battery, preferably a bipolar NiMH battery, that has a better sealability between adjacent cells, to prevent electrolyte leakage paths, in the battery and has better heat conductive properties compared to prior art bipolar batteries.

An advantage with the present invention is that the bipolar battery will be a smaller, lighter, and less costly battery that will have improved operating characteristics than prior art bipolar batteries, such as improved power.

Another advantage with the present invention is that the bipolar battery may be used in the automotive market, or other similar high power portable applications, where high power and low weight steer the choice of battery.

Yet another advantage is that the raw material in a NiMH bipolar battery are available, affordable and can be recycled in an environmental manner.

Further objects and advantages of the present invention will be apparent to those skilled in the art from the following detailed description of the disclosed bipolar electrochemical battery and the methods for producing biplate assemblies having pressed electrodes.

BRIEF DESCRIPTION OF THE DRAWINGS

The different embodiments shown in the appended drawings are not to scale or proportion, but exaggerated to point out different features for the sake of clarity.

FIG. 1 shows a planar view of a first embodiment of a biplate assembly according to the invention.

FIG. 2 shows a cross-sectional view along A-A in FIG. 1.

FIG. 3 shows a cross-sectional, perspective view of a biplate assembly with a moulded seal according to a first embodiment.

FIG. 4 shows a planar view of a second embodiment of a biplate assembly according to the invention.

FIG. 5 shows a cross-sectional view along A-A in FIG. 4.

FIG. 6 shows a cross-sectional view of a biplate assembly with a moulded seal according to a second embodiment.

FIG. 7 shows a cross-sectional view of a biplate assembly with a moulded seal according to third embodiment.

DESCRIPTION OF EXAMPLE, NON-LIMITING EMBODIMENTS

Figure 8A:
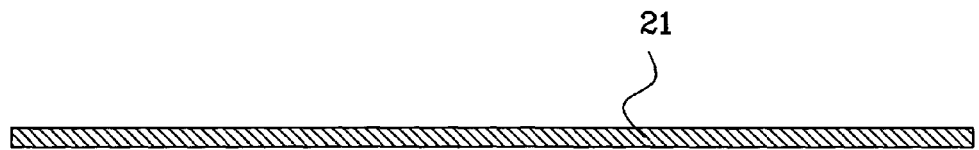
FIG. 8a-8f illustrates a manufacturing process for a bipolar battery according to the present invention.

The major benefits of the bipolar battery design are simplicity and low resistance losses. The parts count of the battery is relative low, consisting only of end plates and biplates, with appropriate assembly and sealing components. Batteries of a desired voltage are constructed by stacking the required number of biplates. The electrical connections between the cells are made as the battery is stacked, since each biplate is electrically conductive and impervious to electrolyte.

With the terminals at each end, the flow of current is perpendicular to the plate, which ensures uniform current and voltage distribution. Since the current path is very short the voltage drop is significantly reduced.

Bipolar batteries will also have significantly reduced weight, volume and manufacturing costs due to elimination of components and the manufacturing approach.

The major problem with bipolar batteries that has not been commercially solved before is obtaining a reliable seal between cells within the bipolar battery. A solution to this problem is presented below.

The seal on a cell is of extreme importance for all types of batteries, and bipolar batteries is no exception. Individual cells contain the active materials (for NiMH batteries it is Nickel Hydroxide positive and metal Hydride Hydrogen storage alloy negative, respectively), separator and electrolyte. The electrolyte is required for ion transport between the electrodes. The best designs, optimised for longevity, weight and volume, require recombination of gasses.

Batteries always produce gasses as they are charged. The gassing rate increases as the battery nears full charge, and reaches maximum when fully charged. The gasses which are produced are oxygen and hydrogen.

Batteries considered for power applications have thin electrodes. Long life with minimum weight and volume are required attributes, which requires a sealed construction.

Oxygen will recombine rather rapidly, so batteries are designed so oxygen will be the first gas generated if the cell is overcharged or overdischarged. This requires two actions:

Overbuild the negative active material, generally by 30%, to ensure that the positive electrode, which will gas oxygen, will be the first to gas.

Provide for gas passage from the positive to the negative, where the oxygen will recombine. The gas passages are obtained by controlling the amount of electrolyte within the pores of the electrode and through the separator. All surfaces of the electrode must be covered by a thin layer of electrolyte for the transport of ions, but the layer must be thin enough to permit gas diffusion through the layer, and must allow gas passages throughout the active layers and the separator.

The negative electrode would gas hydrogen if overcharged. Because hydrogen does not recombine quickly, pressure would build up within the cell. The oxygen recombination effectively discharges the negative at the same rate it is being charged, thus preventing overcharge of the negative.

The surface area of the active material, combined with the uniform voltage distribution of the bipolar design, enhances rapid recombination The bipolar approach will ensure that the voltage drop across the active material will be uniform in all areas, so that the entire electrode will come up to full charge at the same time. This will eliminate the major problem in conventional constructions, where parts of an electrode are overcharging and gassing while other (remote) areas of the electrode are not yet fully charged.

The starved electrolyte condition proposed for this battery allows an engineered approach to solve the electrolyte path leakage problem encountered in other design approaches. By adding hydrophobic barriers and controlling surface tension and adjacent surface wetting characteristics, the biplate or starved separator will wick away all electrolyte present at such boundaries, preventing the formation of a conductive electrical path through an electrolyte path across the hydrophobic barrier.

The cells in regular batteries are sealed to contain the electrolyte both for proper performance of the cells, and to prevent electrolyte paths between adjacent cells. The presence of electrolyte paths between cells will allow the electrolyte connected cells to discharge at a rate that is determined by the resistivity of the path (length of path and cross section of path). The seals on bipolar batteries are more important because the electrolyte path is potentially much shorter. It should be noted that an important feature of this disclosure is the use of a horizontal electrolyte barrier to significantly increase the length of the potential path. An additional concern, is the amount of heat generated by operation of the cell. Depending on the magnitude of heat generated, the design must be able to reject the heat and maintain a safe operating temperature.

If an electrolyte path is developed between cells, a small intercell leakage can be overcome by the periodic full charging of the battery. The battery may be overcharged by a set amount and at a low rate. The low rate would allow fully charged cells to recombine gasses without generating pressure and dissipate the heat from the recombination/overcharge. Cells that have small intercell electrical leakage paths would become balanced.

The flow of heat in a bipolar cell will occur in a radial direction, and in fact end plates are preferably somewhat insulated, to ensure that the end cells operate at the same temperature as the rest of the battery.

The design of the seal must account for the exposure environment of the seal. The seal must be commercially capable of providing the battery performance required by the customer for the intended application. Such a design is presented below.

FIG. 1 is a planar view and FIG. 2 is a cross sectional view (along A-A in FIG. 1) of a first embodiment of a biplate assembly. Normally a biplate assembly requires a frame to make up the individual cells within the battery, but for the sake of clarity the frame is omitted in FIGS. 1 and 2.

The biplate assembly comprises a biplate 11, preferably made from Nickel or Nickel plated steel. A positive electrode 12 and a negative electrode 13 are attached to each side, respectively, of the biplate 11. Each electrode is arranged to cover only a central portion of the side of the biplate 11 to leave space for implementing the sealing and heat conducting means. A hydrophobic barrier 14, which prevents formation of an electrolyte path between cells, is provided on both sides of the biplate between the electrode and an elastomer 15. The elastomer 15 prevents gas leakage from the cell together with the frame (not shown). The elastomer is provided between the barrier 14 and the edge 16 on both sides of the biplate 11.

A series of holes 17 through the biplate 11 are also provided around the perimeter between the elastomer 15 and the edge 16. The holes 17 in the biplate 11 are described in more detail in connection with FIG. 3.

The electrodes 12, 13 may be attached to the biplate 11 in many ways, but preferably the electrodes are manufactured directly onto the biplate by using pressed powder, as is disclosed in the Swedish patent application 0102544-4 with the title "A method for manufacturing a biplate assembly, a biplate assembly and a bipolar battery" by the same applicant. By using the method of pressing powder directly onto the biplate, thin electrodes having less active material may be manufactured.

The shape of the biplate is preferably rectangular to maximise the useful area of the biplate and to better use the biplate for heat conductive purposes. The maximum heat path will be limited to half the length of the shortest side of the rectangle.

The electrolyte barrier 14 is made from a suitable hydrophobic material, such as a flouropolymer or similar materials. The hydrophobic material may be applied to the biplate as a liquid or solid material and then cured in place, which will bond the barrier to the biplate in an efficient way to prevent electrolyte leakage paths between cells.

FIG. 3 shows a perspective view of a complete biplate assembly 10 in cross section, including the frame 18. The frame 18 encompass, in this embodiment, the ring of elastomer 15, and partly encompass the electrolyte barrier 14 on both the negative and positive side of the biplate 11. The frame 18 may have elastic properties allowing it to be compressed when several biplate assemblies 10 are stacked on top of each other to provide good sealing properties of the cells within the battery. Tie rods (not shown) may be applied around the perimeter of the battery to provide the appropriate pressure needed to achieve the sealing of the cells.

On the other hand if the frame 18 is not made from an elastic material, a final sealing material, such as epoxy, must be used to provide the sealing between the endplates and the biplate assemblies.

The frame 18 is provided with guiding means to make it easier to align stacked biplate assemblies 10. These guiding means comprise a tongue 19 arranged on a first side of the frame, e.g. the side corresponding to the positive side, and a corresponding groove 20 on a second side, e.g. the side corresponding to the negative side. The tongue 19 and the groove 20 are positioned directly above the ring of elastomer 15 on each side of the biplate, respectively. The elastomer is preferably more elastic than the material of the frame 18.

In the case when the frame 18 is not elastic, the tongue 19 and the groove 20 will also interact to provide an interim seal to prevent the final assembly sealing material, such as epoxy, from entering the cell when applied.

The elastomer 15 and the frame 18 constitutes together the outer seal of the battery.

The holes 17 through the biplate 11 are filled with the same material making up the frame 18, which preferably is achieved by injection moulding the frame 18, but other techniques may be used. The advantage with providing holes 17 and filling them with moulded material is that the outer seal, i.e. the frame 18 and the encompassed ring of elastomer 15, easily may follow any changes of the size of the biplate. The size of the biplate 11 may change due to heat developed during charging or discharging of the electrodes or the changing ambient temperatures. The elastic properties of the outer seal makes it possible to follow the changes without a breach in the sealing between adjacent cells.

FIG. 4 is a planar view and FIG. 5 is a cross sectional view (along A-A in FIG. 4) of a second embodiment of a biplate assembly, where the frame is omitted for the sake of clarity.

The biplate assembly comprises a biplate 21, preferably made from Nickel or Nickel plated steel. A positive electrode 12 and a negative electrode 13 are attached to each side, respectively, of the biplate 21. Each electrode is arranged to cover only a central portion of the side of the biplate 21 as described in connection with FIGS. 1 and 2. An electrolyte barrier 22 is provided on both sides of the biplate between the electrode and an elastomer 23, which is provided between the electrolyte barrier 14 and the edge 16 on both sides of the biplate 21.

In this embodiment no holes are provided around the perimeter of the biplate 21. The ring of elastomer 23 is in this embodiment made wider, thereby achieving an even better seal to prevent gas leakage due to the elastic properties of the elastomer 23, as will come more apparent from the description of FIGS. 6 and 7.

The barrier, preventing electrolyte leakage, is made from a suitable hydrophobic material, such as fluoropolymer or similar materials as described above. In this embodiment the electrolyte barrier 22 is illustrated as a thin film.

FIG. 6 shows a cross-sectional view of a part of a second embodiment of a complete biplate assembly 30, including a frame 31. The frame encompass the ring of elastomer 23 and partly encompass the electrolyte barrier 14 on both sides of the biplate 21. The frame 31 also has guiding means 19, 20 as described above, with the exception that tapered surfaces 32 and 33 are provided on each side of the tongue 19. The advantage with this arrangement is to provide additional means to introduce pressure onto the elastomer 23 when several biplates are stacked. The highest pressure will be directed to an area directly above and underneath each ring of elastomer 23.

FIG. 7 shows a cross-sectional view of a part of a third embodiment of a complete biplate assembly 40, including a frame 41. The frame encompass only the ring of elastomer 23 on both sides of the biplate 21. The frame 41 also has guiding means 19, 20 as described above, with tapered surfaces 42 and 43 provided on each side of the tongue 19. The advantage with this arrangement is the same as described in connection with FIG. 6.

It is essential that the frame encompass the ring of elastomer to prevent gas leakage from one cell to another. The electrolyte barrier, preventing electrolyte leakage, will function the same irrespectively if the frame partly encompass it or not.

FIG. 8a-8f illustrates a manufacturing process in cross section for a bipolar battery according to the invention.

A biplate 21 is provided in FIG. 8a, which has a predetermined size. The size may vary depending on the intended application.

Figure 8B:
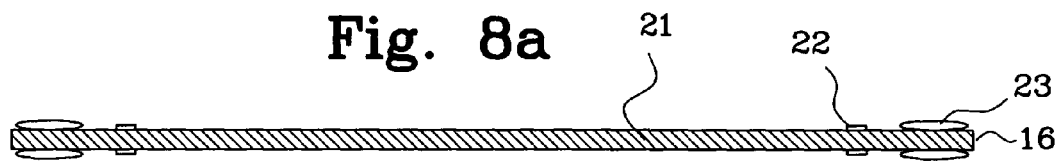

FIG. 8b illustrates the appearance after the steps of providing an electrolyte barrier 22 and a ring of elastomer 23. The electrolyte barrier 22 is provided on both sides of the biplate in a closed path around the area where the electrodes are to be positioned. The ring of elastomer 23, i.e. a closed path of an elastic material, is provided on both sides of the biplate 21 between the electrolyte barrier 22 and the edge 16 of the biplate.

Figure 8C:
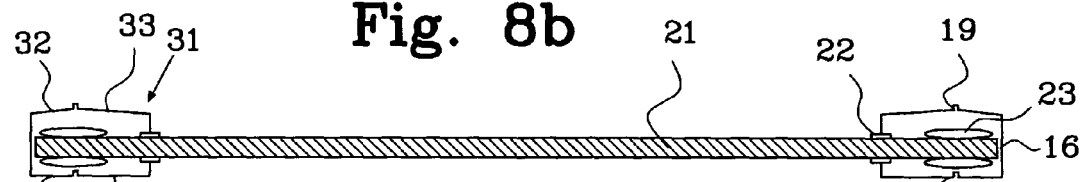

In FIG. 8c a frame 31 has been arranged around the perimeter of the biplate, encompassing the ring of elastomer 23 and partly encompassing the electrolyte barrier 22. In this example the frame 31 is provided with tapered surfaces 32 and 33 around a tongue 19. A groove 20 is also provided as previously described, where the surfaces 34 and 35 around the groove 20 is essentially flat or slightly tapered.

Where epoxy assembly is required, the assembly should be compressed with the tongue and grooves aligned. This compresses the elastomer and seals the cell, and the taper allows space for addition of the epoxy.

Figure 8D:
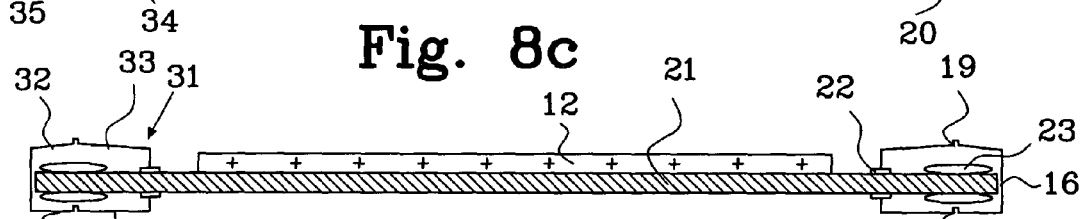
Figure 8E:
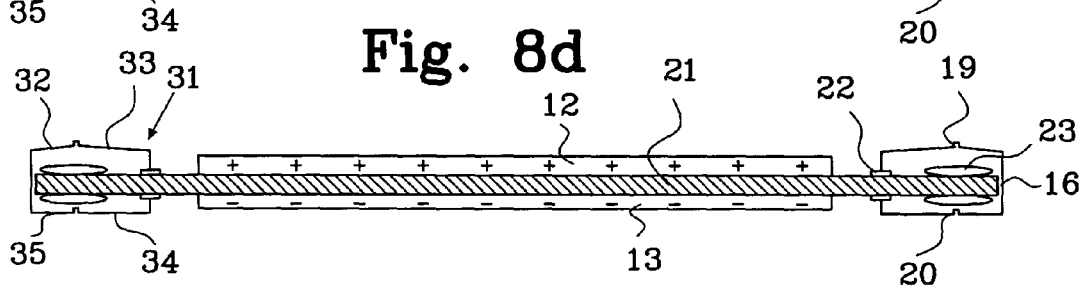

A positive electrode 12 is arranged on a first side of the biplate 21 in FIG. 8d, and a negative electrode 13 is arranged on a second side of the biplate 21 in FIG. 8e. The electrodes are preferably made from pressed powder as described above.

The result of this step is the complete biplate 30 assembly that is the essential part of the bipolar NiMH battery.

Figure 8F:
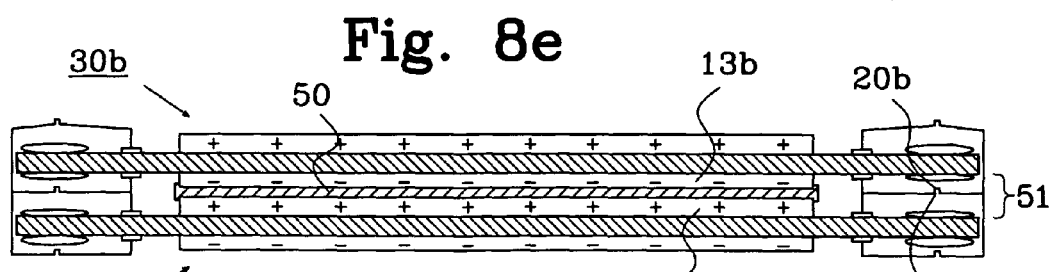

FIG. 8f illustrates what happens when two biplate assemblies are stacked on top of each other. A first biplate assembly 30b is arranged on top of a second biplate assembly 30a so that the tongue 19a of the second biplate assembly 30a is inserted into the groove 20b of the first biplate assembly 30b. A separator 50 is arranged between the positive electrode 12a of the first biplate assembly 30a and the negative electrode 13b of the second biplate assembly 30b.

Typically the separator 50 comprises about 5% voids for gas passages. The gas passages provide a possibility for the gas created at the positive electrode 12a, during charging, to find a path to the negative electrode 13b where it will recombine.

The separator is squeezed between the electrodes and kept in place by friction when the biplate assemblies 30a, 30b are pressed towards each other. The pressure will deform the frame so that the tapered surfaces 32 and 33 of the first biplate assembly 30a will, at least partially, be in contact with the essentially flat surfaces 34 and 35 around the groove 20. A force will deform the rings of elastomer 23 being adjacent the deformed surfaces, thereby establishing an effective outer seal. A battery cell is indicated by the reference numeral 51.

A bipolar battery also needs a positive end plate and a negative end plate to complete the battery. This is illustrated in FIG. 9, which show a complete bipolar battery including three battery cells, cell 1, cell 2 and cell 3.

Figure 9:
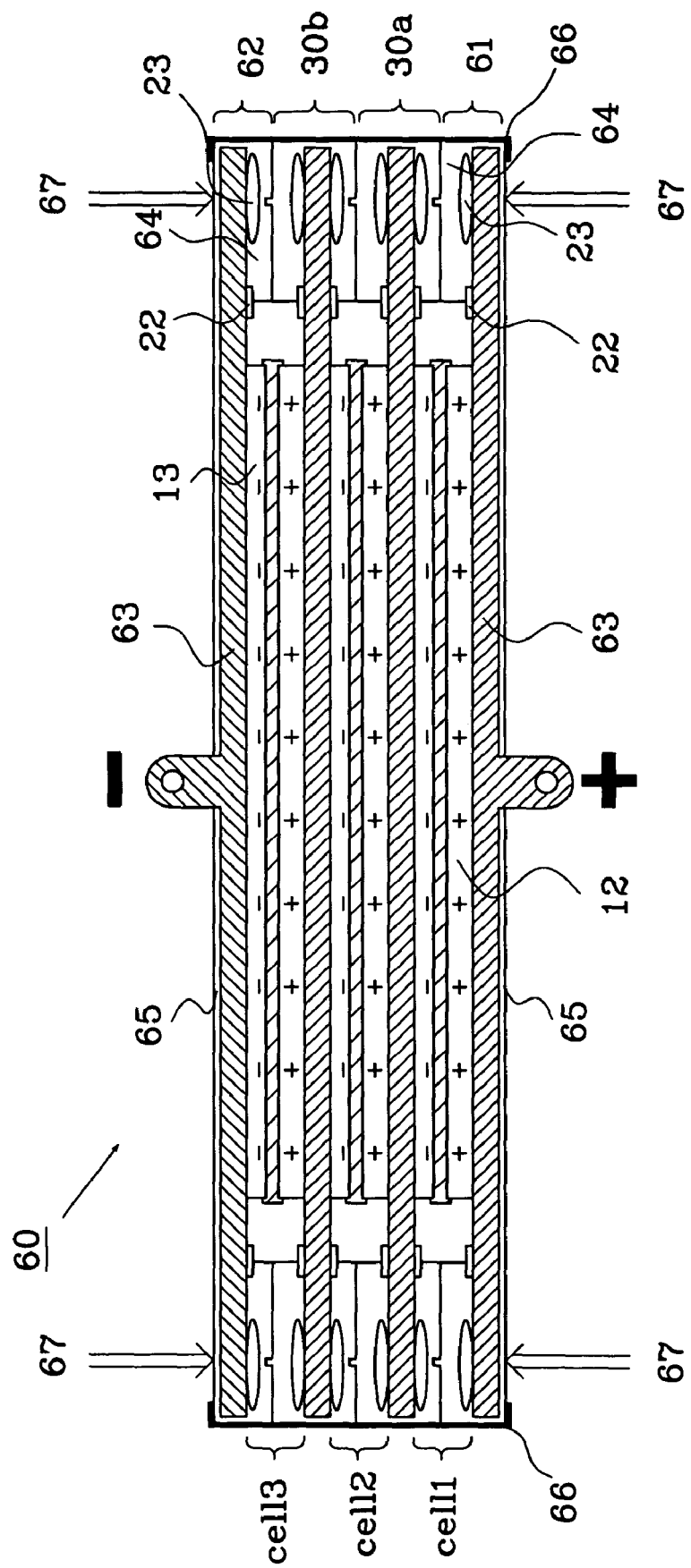
FIG. 9 shows a bipolar battery according to the present invention.

The battery 60 in FIG. 9 comprises a positive end terminal 61, two stacked biplate assemblies 30a and 30b (as previously described in FIG. 8f) and a negative end terminal 62.

The positive 61 and negative 62 end terminal are comprised of an end plate 63 and a positive electrode 12 and a negative electrode 13, respectively. The structure of the end terminals is similar to the biplate assemblies with the exception that only a first side of the biplate carries an electrode, electrolyte barrier 22 and a ring of elastomer 23. A frame 64 is created on each end terminal to allow attachment to the stacked biplate assemblies. Terminal cover 65 is provided on the second side of each end plate.

A sleeve 66 is provided around the battery cells to maintain the parts of the battery in operating position after pressure has been applied to the end plates to seal each cell properly, as indicated by the arrows 67. The sleeve may be used as an alignment guide, which indicate that the tongue 19 and the groove 20 would not be necessary to align the endplates and biplate assemblies.

An alternative to the sleeve is to provide holes around the perimeter of the frames from the positive end plate to the negative endplate. These holes could be used for tie rods to maintain stacked compression and internal gas pressure on the end plates.

The bipolar Nickel Metal Hydride battery appears to be a perfect battery for niche applications such as Hybrid vehicles, soft hybrid systems, Industrial applications, and numerous other applications that will become apparent for a man skilled in the art. The battery will be smaller, lighter, more efficient and have an increased battery life for its type of applications compared to prior art batteries.

Although the description only handles a NiMH bipolar battery, the claims should not be interpreted in a limited sense, but also include other types of batteries, such as Nickel Cadmium batteries.

What is claimed is:

1. A method of manufacturing a biplate assembly, the method comprising:
   providing a biplate having a first side and a second side;
   arranging a positive electrode on the first side of the biplate;
   arranging a negative electrode on the second side of the biplate;
   providing a barrier of a hydrophobic material on the biplate so that the barrier surrounds the positive and the negative electrodes, respectively; and
   arranging an outer seal around an edge of the biplate, such that the edge of the biplate extends into the outer seal.

2. The method according to claim 1, wherein arranging the outer seal comprises mounting a ring of elastomer on the first and the second sides of the biplate between the edge and the barrier.

3. The method according to claim 2, wherein arranging the outer seal further comprises providing a frame to encompass the ring of elastomer on both the first and the second sides of the biplate.

4. The method according to claim 3, wherein at least one side of the frame has a tapered surface.

5. The method according to claim 3, wherein the biplate is provided with openings through which the frame extends.

6. The method according to claim 3, wherein the frame is provided with a guide to align the biplate assembly with adjacent biplate assemblies and end terminals.

7. The method according to claim 6, wherein the guide comprises a tongue arranged on the frame on the first side of the biplate, and a groove arranged on the frame on the second side of the biplate.

8. The method according to claim 3, wherein the frame partly encompasses the barrier on both the first and the second sides of the biplate.

9. The method according to claim 1, wherein said outer seal is close to an ambient environment.

10. The method according to claim 9, wherein the edge of the biplate is positioned close to a part of the outer seal being close to the ambient environment.

11. A method of manufacturing a bipolar battery, the method comprising:
    providing a housing;
    providing a negative end terminal in the housing;
    providing a positive end terminal in the housing;
    preparing at least one biplate assembly by
       providing a biplate having a first side and a second side;
       arranging a positive electrode on the first side of the biplate;
       arranging a negative electrode on the second side of the biplate;
       providing a barrier of a hydrophobic material on the biplate so that the barrier surrounds the positive and the negative electrodes, respectively; and
       arranging an outer seal around an edge of the biplate, such that the edge of the biplate extends into the outer seal; and
    situating the at least one biplate assembly between the negative and the positive end terminals.

12. The method according to claim 11, wherein arranging the outer seal comprises mounting a ring of elastomer on the negative and the positive sides of the biplate between the edge and the barrier.

13. The method according to claim 12, wherein arranging the outer seal further comprises providing a frame to encom pass the ring of elastomer on both the negative and the positive sides of the biplate.

14. The method according to claim 13, wherein at least one side of the frame has a tapered surface.

15. The method according to claim 13, wherein the biplate is provided with openings through which the frame extends.

16. The method according to claim 13, wherein the frame is provided with a guide to align the biplate assembly with adjacent biplate assemblies and end terminals.

17. The method according to claim 16, wherein the guide comprises a tongue arranged on the frame on the positive side of the biplate, and a groove on the frame on the negative side of the biplate.

18. The method according to claim 13, wherein the frame partly encompasses the barrier on both the negative and the positive sides of the biplate.

* * * * *